(12) United States Patent
Morita et al.

(10) Patent No.: US 11,153,700 B2
(45) Date of Patent: Oct. 19, 2021

(54) SIGNAL DELAY ADJUSTMENT DEVICE, SIGNAL DELAY ADJUSTMENT METHOD, AND SIGNAL PROCESSING DEVICE

(71) Applicant: Clarion Co., Ltd., Saitama (JP)

(72) Inventors: Hideyuki Morita, Saitama (JP); Takeshi Hashimoto, Motomiya (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/646,768

(22) PCT Filed: Jul. 19, 2018

(86) PCT No.: PCT/JP2018/027092
§ 371 (c)(1),
(2) Date: Mar. 12, 2020

(87) PCT Pub. No.: WO2019/054048
PCT Pub. Date: Mar. 21, 2019

(65) Prior Publication Data
US 2020/0213798 A1    Jul. 2, 2020

(30) Foreign Application Priority Data

Sep. 13, 2017    (JP) .............................. JP2017-175308

(51) Int. Cl.
*H04S 3/00*    (2006.01)
*H04R 3/12*    (2006.01)
*H04S 7/00*    (2006.01)

(52) U.S. Cl.
CPC ............... *H04S 3/002* (2013.01); *H04R 3/12* (2013.01); *H04S 7/30* (2013.01)

(58) Field of Classification Search
CPC ... H04S 3/002; H04S 7/30; H04S 7/00; H04R 3/00; H04R 3/12; B60R 11/02
See application file for complete search history.

(56) References Cited

U.S. PATENT DOCUMENTS

2005/0018860 A1   1/2005  Furge et al.
2005/0069148 A1*  3/2005  Nishikawa .............. H04S 1/002
                                          381/89
(Continued)

FOREIGN PATENT DOCUMENTS

JP    H01-248800 A    10/1989
JP    H11-299000 A    10/1999
(Continued)

OTHER PUBLICATIONS

International Search Report issued in corresponding PCT Application No. PCT/JP2018/027092 dated Sep. 18, 2018 with English translation.
(Continued)

*Primary Examiner* — Andrew L Sniezek
(74) *Attorney, Agent, or Firm* — Foley & Lardner LLP

(57) ABSTRACT

A signal delay adjustment device for individually setting delay times of audio signals supplied to a plurality of speakers and individually delaying the audio signals supplied to the plurality of speakers with set delay times to adjust output timings of sounds among the plurality of speakers is configured to include a setting part to set a delay time applied to the audio signal for each speaker, and a delay part for individually delaying the audio signal to be supplied to the plurality of speakers based on the delay time set by the setting part. The delay part gradually changes the delay time to be applied to the audio signal over a predetermined time so that the delay time to be applied to the audio signal reaches the delay time set by the setting part over the predetermined time.

15 Claims, 15 Drawing Sheets

(56) References Cited

U.S. PATENT DOCUMENTS

2006/0262935 A1 11/2006 Goose et al.
2013/0156228 A1* 6/2013 Katayama ................ H03G 3/20
  381/107

FOREIGN PATENT DOCUMENTS

| JP | 2003-199199 A | 7/2003 |
| JP | 2007-041013 A | 2/2007 |
| JP | 2013-110568 A | 6/2013 |
| WO | WO-02/091798 A2 | 11/2002 |

OTHER PUBLICATIONS

Extended European Search Report dated May 11, 2021 in European Application No. 18856742.4.
International Preliminary Report on Patentability and Written Opinion of the International Searching Authority issued in corresponding application No. PCT/JP2018/027092 dated Mar. 26, 2020 with English translation.

* cited by examiner

SIGNAL DELAY ADJUSTMENT DEVICE, SIGNAL DELAY ADJUSTMENT METHOD, AND SIGNAL PROCESSING DEVICE

TECHNICAL FIELD

The present invention relates to a signal delay adjusting apparatus, a signal delay adjusting method and a signal processing device.

BACKGROUND ART

Generally, in a vehicle such as an automobile, speakers are installed at a plurality of positions in a vehicle cabin. As an example, a vehicle in which a speaker is installed in each of a right door portion (driver's seat side door portion) and a left door portion (passenger's seat side door portion) will be described. It is assumed that the speakers of both the door portions are installed at positions symmetrical with respect to a center line which divides the interior of the vehicle cabin into two halves in the left and right direction. If the user is in the center of the vehicle interior, a distance between the speaker of the right door section and the user is equal to a distance between the speaker of the left door section and the user. In this case, the sounds simultaneously output from the speakers of both door portions reach the user's ears at the same time. As a result, a sound image (a virtual image of a sound perceived by the user) generated by the sound emitted from a sound source (in the above case, speakers of both door portions) is localized in front of the user, for example. That is, the user who is located in the center of the vehicle interior perceives the sounds output from the speakers of both the door portions as being emitted from the front.

However, in general, seats such as the driver's seat and the passenger's seat are not arranged in the center of the vehicle interior. For example, when the user is seated in the driver's seat, the distance between the speaker of the right door portion and the user and the distance between the speaker of the left door portion and the user are not equal. In the case of the right-hand drive vehicle, the former distance is shorter than the latter distance. Therefore, when sounds are simultaneously output from the speakers of both door portions, the sound output from the speaker of the right door portion reaches the ear of the user seated in the driver's seat, and thereafter, the sound output from the speaker of the left door portions reaches the ear. In this case, a sound image (a virtual image of the sound perceived by a user sitting in the driver's seat) generated by the sound emitted from the speakers of the both door portions is localized to the right front of the user (for example, a position outside the vehicle cabin) by the Haas effect (a phenomenon in which the localization is biased in a direction in which the sound source of the sound that reaches the user ears earliest is located).

When a sound image is localized at a position deviated from the front of a person (e.g., at a position outside the vehicle cabin), some people may feel a sense of discomfort or displeasure. As a function for reducing this kind of discomfort and/or displeasing feeling, a signal delay adjustment function (a time alignment function) is known.

By the signal delay adjustment function, an individual delay time is set for the audio signal supplied to each speaker, and the audio signal is individually delayed by the set delay time, thereby adjusting the output timings of sounds among a plurality of speakers. The audio signal is an electrical signal of the sound, and includes a sound signal and an acoustic signal. When the output timings of the sounds emitted from the respective speakers are adjusted by the signal delay adjustment function such that the sound output from each speaker simultaneously reaches the ears of the user who sits at a specific position (for example, the driver's seat) in the vehicle cabin, the sound image generated by these sounds (the virtual image of the sound perceived by the user who sits at the specific position) is localized in front of the user, for example. This reduces the sense of discomfort and/or the pleasure that the user perceives when the sound image is localized at a position deviating from the front of the user.

Japanese Patent Application Provisional Publication No. 2013-110568 (hereinafter referred to as "Patent Document 1") describes a signal delay adjustment device having the signal delay adjustment function of this type. The signal delay adjusting device disclosed in the Patent Document 1 is a device capable of reproducing an audio signal recorded on a recording medium such as a CD (Compact Disc) via a plurality of speakers, and includes a touch panel display as a user interface. On the display screen of the touch panel display, icons for setting a delay time to be applied to the audio signal for each speaker (in other words, icons for adjusting the output timings of sounds among the speakers) are displayed.

In the Patent Document 1, for example, the user sitting in a driver's seat can set a delay time to be applied to an audio signal for each speaker by performing a touch operation on the icons corresponding to respective speakers displayed on a display screen while listening to sounds (e.g., music recorded on a recording medium) output from each speaker. As the audio signal supplied to each speaker is individually delayed by the set delay time, the output timings of the music are changed among the speakers. Since the output tunings of the music are changed among the speakers, the order in which the sounds output from the speakers reach the ears of the user seated in the driver's seat and the time differences among the sounds reaching the ears of the user seated in the driver's seat are changed. Therefore, the position at which the sound image (the virtual image of the sound perceived by the user sitting in the driver's seat) is localized changes. The user sitting in the driver's seat can set the delay time to be applied to the audio signal, for example, until the sound image is localized at a desired position.

SUMMARY OF THE INVENTION

In Patent Document 1, when the delay time applied to the audio signal is changed while a sound is being output from the speakers, the phase of the audio signal is discontinuously changed before and after the change of the delay time (specifically, a rotation speed of the phase is rapidly changed at the time of the change of the delay time). Therefore, the audio signal is distorted, harmonics not originally included in the audio signal are superimposed on the audio signal, and abnormal sounds (for example, sounds such as "pop" and "bob") are output from the speakers.

In order to prevent this kind of abnormal sound from being output from the speaker, it is known to mute the sound output from the speaker when changing the delay times applied to the audio signals, although it is not described in Patent Document 1. However, if the sounds output from the speakers are interrupted by muting before and after the change of the delay times, it becomes difficult tier the user who performs the change operation of the delay times to perceive how the position of the sound image generated by the sound output from the respective speakers changes before and after the change of the delay times.

The present invention has been made in view of the above circumstances, and an object thereof is to provide a signal delay adjustment device and a signal delay adjustment method capable of suppressing abnormal sounds output when changing a delay times applied to the audio signal without muting the sounds output from the speakers. It is another object of the present invention to provide a signal processing device for processing an audio signal, which can suppress an abnormal sound superimposed on the audio signal supplied to the speakers when the state of the audio signal changes, for example, when the delay times are changed, without muting the sound output from the speakers.

A signal delay adjustment device according to an embodiment of the present invention is a device configured to adjust the output timings of sounds among a plurality of speakers by individually setting the delay time of audio signals supplied to a plurality of speakers and individually delaying the audio signals supplied to the plurality of speakers by set delay times, and includes a setting part configured to set the delay times applied to the audio signals for respective speaker, and a delay part configured to individually delay the audio signals supplied to the plurality of speakers based on the delay times set by the setting part. The delay part gradually changes the delay time to be applied to each audio signal over a predetermined time so that the delay times to be applied to the audio signals reach the delay times set by the setting part over the predetermined time.

In the signal delay adjustment device configured as described above, since the delay time applied to the audio sill is gradually changed over a predetermined time until the delay time is reached the delay time after the setting is changed, a change in a phase rotation speed of the audio signal at the time of changing the delay time is suppressed. As a result, distortion of the audio signal is suppressed, and generation of abnormal sounds due to distortion of the audio signal is suppressed. That is, in the signal delay adjustment device according to an embodiment of the present invention, the generation of abnormal sound due to the distortion of the audio signal is suppressed, and at the same time, the sound output from the speakers is not interrupted before and after the change of the delay time by muting (i.e., the sound is being output from the speakers while the audio signal being gradually delayed), so that, for example, the user who performs the operation of changing the delay time can easily perceive how the position of the sound image generated by the sound output from each speaker changes before and after the change of the delay time.

In addition, the signal delay adjustment device according to an embodiment of the present invention may further include an input part that allows the user to input the change amount of the delay time to be applied to the audio signal for each speaker. In this case, the setting part changes the set value of the delay time to be applied to the audio signal for each speaker based on the input by the user through the input part. The delay part gradually changes the delay time to be applied to the audio signal over a predetermined time so that the delay time to be applied to the audio signal reaches the delay time after the change by the setting part over a predetermined time.

In addition, in an embodiment of the present invention, the input part may be configured to allow the user to input an arbitrary value as the change amount of the delay time to be applied to the audio signal for each speaker. In this case, the setting part changes the set value of the delay time to be applied to the audio signal for each speaker based on the arbitrarily input value input through the input part. The delay part gradually changes the delay time applied to the audio signal over a longer period of time as the amount of change in the delay time changed by the setting part is larger.

The larger the amount of change in the delay time applied to the audio signal is, the more abruptly the phase rotation speed of the audio signal changes when the delay time is changed and the more greatly the audio signal is distorted. Therefore, the delay part gradually changes the delay time applied to the audio signal over a longer period of time as the amount of change in the delay time is larger. As a result, even when the change amount of the delay time applied to the audio signal is large, the change of the phase rotation speed of the audio signal at the time of the change of the delay time is suppressed, and the abnormal sound due to the distortion of the audio signal can be suppressed to such a degree that the user who is seated in the driver's seat and inputs the change amount of the delay time is not worried thereabout.

In addition, in an embodiment of the present invention, the input part may be configured to allow the user to input a predetermined fixed value as the change amount of the delay time to be applied to the audio signal for each speaker. In this case, the setting part may change the set value of the delay time to be applied to the audio signal for each speaker by the delay time of the fixed value based on the input by the user through the input part.

In addition, the signal delay adjustment device according to an embodiment of the present invention may further comprise a storage part configured to store, in advance, a delay time for each speaker, an instructing part configured to instruct whether or not to set a delay time for each speaker stored in the storage part as a delay time to be applied to an audio signal for each speaker, and a calculating part configured to calculate, for each speaker, a change amount of the delay time to be applied to the audio signal based on the delay time for each speaker stored in the storage part and the currently set delay time for each speaker when the instructing part instructs to set the delay time for each speaker to be applied to the audio signal. In this case, the setting part changes the set value of the delay time to be applied to the audio signal for each speaker based on the change amount of the delay time calculated by the calculation part. The delay part gradually changes the delay time of the audio signal supplied to each speaker over a longer period of time as the amount of change in the delay time changed by the setting part is larger.

In the signal delay adjustment device configured as described above, the user can set the delay times to be applied to the audio signals to be supplied to respective speakers at one time by using the delay times for respective speakers stored in advance in the storage part. Even when performing such setting, by gradually changing the delay time applied to the audio signal by the delay part over a longer period of time as the amount of change in the delay time is larger, it is possible to suppress a change in the phase rotation speed of the audio signal at the time of changing the delay time, and suppress an abnormal sound due to distortion of the audio signal.

The signal delay adjustment device according to an embodiment of the present invention may be installed in a vehicle. In this case, the delay time for each speaker stored in the storage part is set in advance so that, for example, the sound output from each speaker simultaneously matches a predetermined seat position in the vehicle.

In the signal delay adjustment device configured as described above, a user seated in a predetermined seat can localize a sound image generated by sounds output from respective speakers at an appropriate position (e.g., a front position of the user).

The signal processing device according to an embodiment of the present invention includes a signal processing part that changes an audio signal to be supplied to the speaker from a first state to a second state. The signal processing part gradually changes the audio signal from the first state to the second state over a predetermined period of time so that distortion of the audio signal that occurs temporarily as the audio signal changes from the first state to the second state is suppressed.

In the signal processing device configured as described above, since the distortion of the audio signal is suppressed by gradually changing the audio signal from the first state to the second state over a predetermined period of time, occurrence of abnormal sounds due to the distortion of the audio signal is suppressed. That is, in the signal processing device according to an embodiment of the present invention, generation of abnormal sound due to distortion of the audio signal is suppressed without muting the sound output from the speaker.

Further, in the signal processing device according to an embodiment of the present invention, the signal processing part may be configured to individually delay the audio signals supplied to the plurality of speakers. In this case, the audio signals in the second state are obtained by applying a predetermined amount of delay to the audio signals in the first state.

The signal processing device according to an embodiment of the present invention may further include a setting part for changing the delay time to be applied to the audio signal for each speaker. In this case, the signal processing part gradually changes the audio signal from the first state to the second state so that the delay time applied to the audio signal reaches the delay time set by the setting part over a predetermined time.

Further, in the signal processing device according to an embodiment of the present invention, the signal processing part may be configured to gradually change the audio signal from the first state to the second state over a longer period of time as the delay time applied to the audio signal by the setting part is changed more greatly.

A signal delay adjustment method according to the embodiment of the present invention is a method of adjusting output timings of sounds among a plurality of speakers by individually setting delay times of audio signals to be supplied to a plurality of speakers and individually delaying the audio signals supplied to the plurality of speakers by the set delay times, and is a method of causing a predetermined device to execute a setting step of setting the delay times to be applied to the audio signals for each speaker and a delay step of individually delaying the audio signals to be supplied to the plurality of speakers based on the delay times set in the setting step. In the delay step, the delay time to be applied to the audio signal is gradually changed over a predetermined time so that the delay time to be applied to the audio signal reaches the delay time set in the setting step over a predetermined time.

According to an embodiment of the present invention, there are provided a signal delay adjustment device and a signal delay adjustment method capable of suppressing an abnormal sound which is output when changing delay, times applied to audio signals without muting sound output from speakers. Also provided is a signal processing device capable of suppressing an abnormal sound superimposed on a sound when a state of the audio signal supplied to the speaker changes when, for example, a delay time is changed, without muting a sound output from the speaker.

EMBODIMENT FOR CARRYING OUT THE INVENTION

Hereinafter, a signal delay adjustment system according to an embodiment of the present invention will be described with reference to the drawings. A signal delay adjustment system according to an embodiment of the present invention is a system installed in a vehicle, and includes a signal delay adjustment device having a signal delay adjustment function (time alignment function) and a plurality of speakers connected to the signal delay adjustment device.

Figure 1:
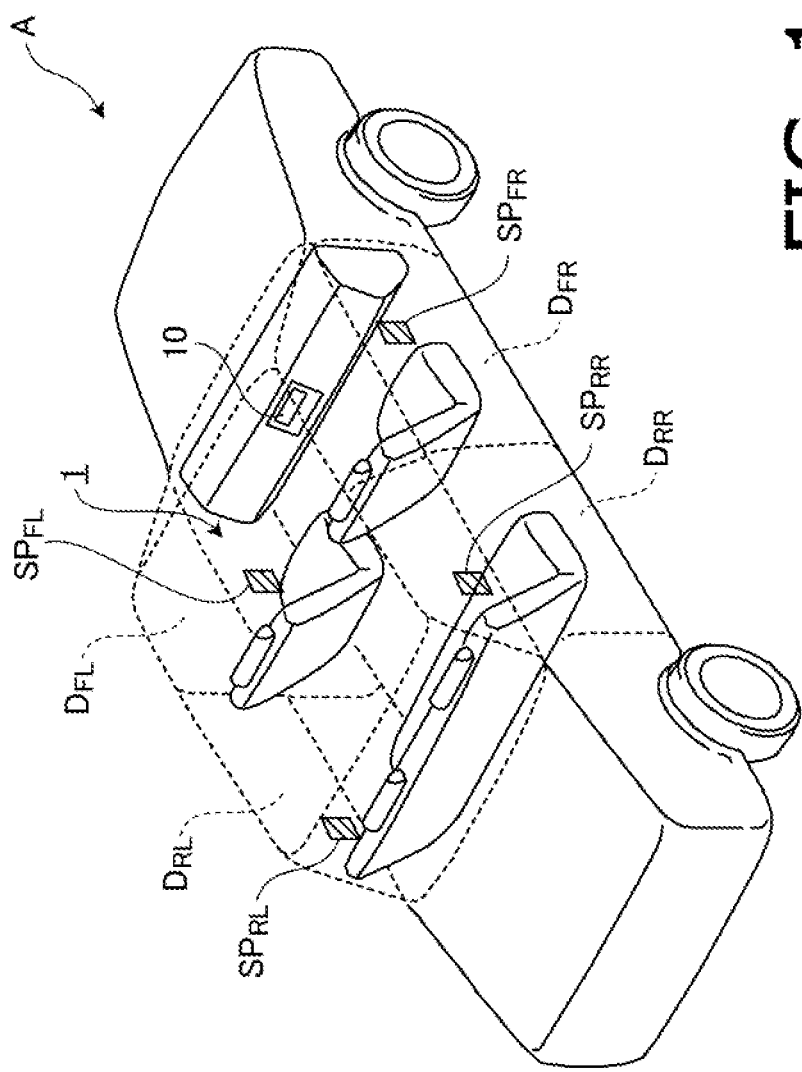
FIG. 1 is a diagram schematically showing a vehicle in which a signal delay adjustment system including a signal delay adjustment device according to an embodiment of the present invention and speakers are installed.

FIG. 1 is a figure schematically showing a vehicle A of a user in which a signal delay adjustment system 1 according to an embodiment of the present invention is installed. In FIG. 1, a part of the body of the vehicle A is shown transparent so that the signal delay adjustment system 1 installed in the vehicle A can be seen.

As shown in FIG. 1, the signal delay adjustment system 1 includes a signal delay adjustment device 10 and speakers $SP_{FR}$, $SP_{FL}$, $SP_{RR}$ and $SP_{RL}$ connected to the signal delay adjustment device 10. In the present embodiment, for the purpose of description, regarding components to which subscript characters ($_{FR, FL, RR, RL}$) are used, the subscript characters are attached as "speakers $SP_{FR}$, $SP_{FL}$, $SP_{RR}$ and $SP_{RL}$" when they are described separately, while subscript characters are not attached as "speaker SP" when they are not described separately.

The signal delay adjustment device 10 is installed, for example, on the dashboard, and has the signal delay adjustment function of individually setting a delay time to be applied to an audio signal supplied to each speaker SP to individually delay the audio signal based on the set delay time, thereby adjusting the output timings of sounds among a plurality of speakers SP. The speakers $SP_{FR}$, $SP_{FL}$, $SP_{RR}$ and $SP_{RL}$ are respectively installed in a door portion $D_{FR}$ on the driver's seat side, a door portion $D_{FL}$ on the passenger's seat side, a door portion $D_{RR}$ on the right side of the rear seat, and a door portion $D_{RL}$ on the left side of the rear seat. Hereinafter, for convenience of explanation, the delay times applied to the audio signals supplied to the speakers $SP_{FR}$, $SP_{FL}$, $SP_{RR}$ and $SP_{RL}$ will be referred to as delay times $D_{FR}$, $D_{FL}$, $D_{RR}$ and $D_{RL}$, respectively.

The signal delay adjustment device 10 outputs the audio signals stored in the recording medium RM to the speakers $SP_{FR}$, $SP_{RL}$, $SP_{RR}$ and $SP_{RL}$. Then, the music or the like recorded on the recording medium RM is reproduced. The recording medium RM could be, for example, a disc medium such as a CD and a SACD (Super Audio CD), and a storage medium such as an HDD (Hard Disk Drive) and a USB (Universal Serial Bus) memory.

Figure 2:
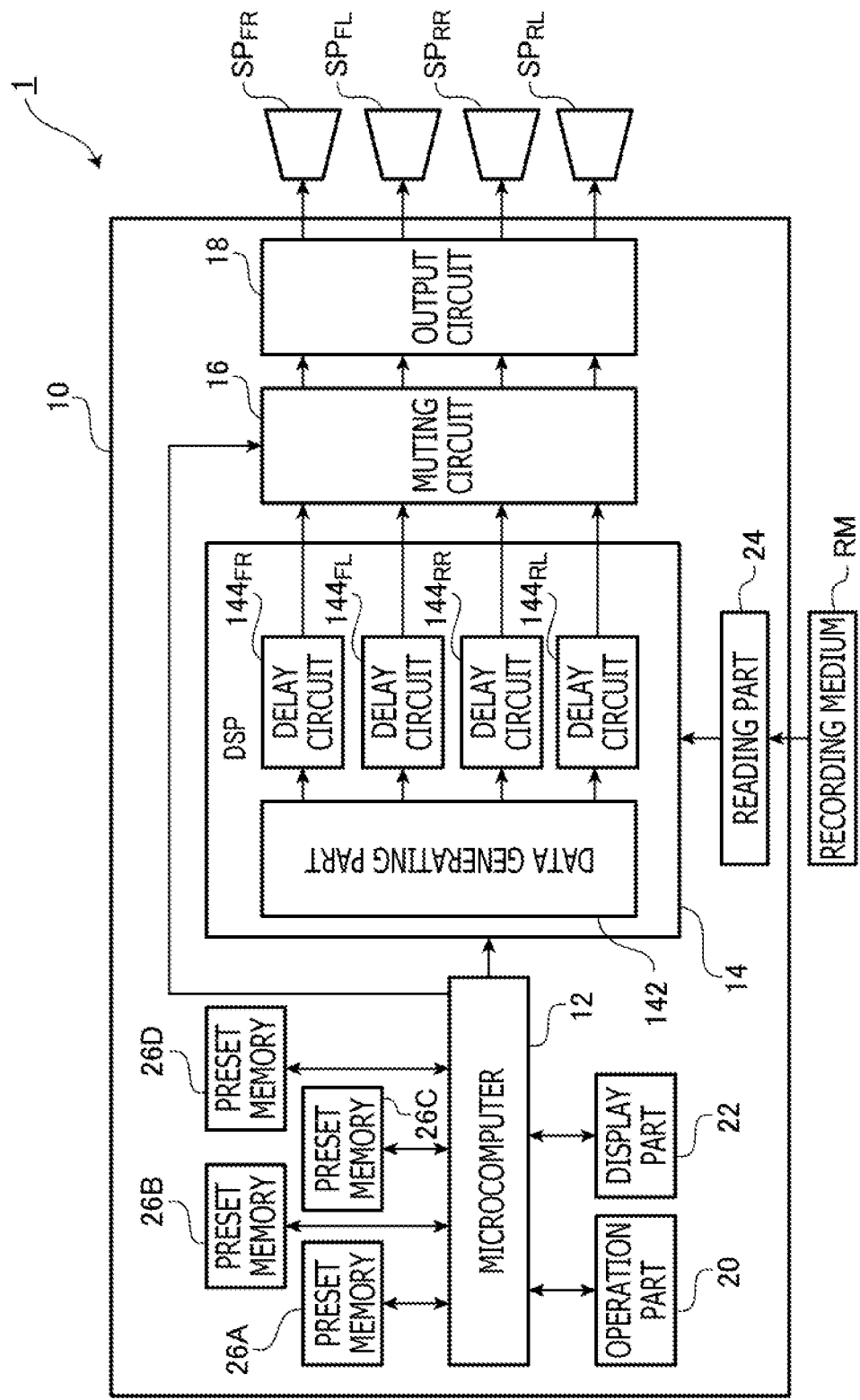
FIG. 2 is a block diagram showing a configuration of the signal delay adjustment system according to the embodiment of the present invention.

FIG. 2 is a block diagram showing a configuration of a signal delay adjustment system 1 according to the embodiment of the present invention. As shown in FIG. 2, the delay adjustment device 10 includes a microcomputer 12, a DSP (Digital Signal Processor) 14, a muting circuit 16, an outputting circuit 18, an operation part 20, a display part 22, a reading part 24, and preset memories 26A-26D. In FIG. 2, main components necessary for describing the present embodiment are illustrated, and some components such as a housing, which is a generally-known component for a signal delay adjustment device, are omitted as appropriate.

The microcomputer 12 is an IC (Integrated Circuit) for controlling the signal delay adjustment device 10, and includes a CPU (Central Processing Unit), a ROM (Read Only Memory) for storing a control program to be executed by the CPU, a RAM (Random Access Memory) for temporarily storing various pieces of data required for executing the control program, and the like.

The operation part 20 includes, for example, a power button provided to the signal delay adjustment device 10. When the power button is pressed by the user in a state where the signal delay adjustment device 10 is powered off, the microcomputer 12 reads and executes the control program stored in the ROM. As a result, the signal delay adjustment device 10 is activated.

The reading part 24 is a reading device that reads audio signals stored in the recording medium RM. The audio signal read by the reading part 24 is input to the DSP 14. The DSP 14 applies various kinds of signal processing such as an equalizing process, a time alignment process and a delaying process to the audio signals input from the reading part 24, and outputs the audio signals to the muting circuit 16. The time alignment process and the delay process will be described in detail later.

The muting circuit 16 through-outputs the audio signal input from the DSP 14 to the output circuit 18 through or blocks the output of the audio signal to the output circuit 18 in accordance with the control signal input from the microcomputer 12.

It is assumed that parameter values for equalizing process, such as gain values for each frequency band, are stored in the preset memories 26A-26D. In this instance, the DSP 14 reads the parameter values stored in the preset memory 26A or the like in response to, for example, a user's operation of the operation part 20 and performs an equalizing process on the basis of the read parameter values. When the above operation is performed, the microcomputer 12 outputs the control signal to the mute circuit 16. As a result, when the setting of the equalizer is changed by the parameter values read from the preset memory 26A or the like, the sound output from each speaker SP is temporarily muted.

The output circuit 18 DA-converts and amplifies the audio signals input from the DSP 14, and outputs the audio signals to the speakers SP. As a result, the diaphragm of each speaker SP vibrates, and a sound wave corresponding to the audio signal is output from each speaker SP. Accordingly, the user can listen to the music or the like recorded on the recording medium RM.

Next, a description will be given of a signal delay adjustment process (the time alignment process) in which the delay time D for each speaker SP is individually set and each audio signal is individually delayed by the set delay time D to adjust the output timings of sounds among the speakers SP.

In the present embodiment, when the setting of the delay time D is changed, the delay time D is gradually changed over a predetermined period of time until the changed delay time D is reached as the delay process is executed in the DSP 14. This suppresses distortion of the audio signal that occurs as the delay time D is changed, in other words, as the phase rotation speed of the audio signal changes rapidly when the delay time is changed. Since the generation of abnormal sound due to distortion of the audio signals is suppressed and at the same time, the sound output from the speakers SP is not interrupted before and after the change of the delay time D by muting (i.e., the sound is being output from the speaker SP while the delay time being gradually delayed), the user who, for example, sits in the driver's seat and performs the setting change of the delay time D is easier to perceive the change in the position of the sound image before and after the change of the delay time D the virtual image of the sound perceived by the user).

Figure 3:
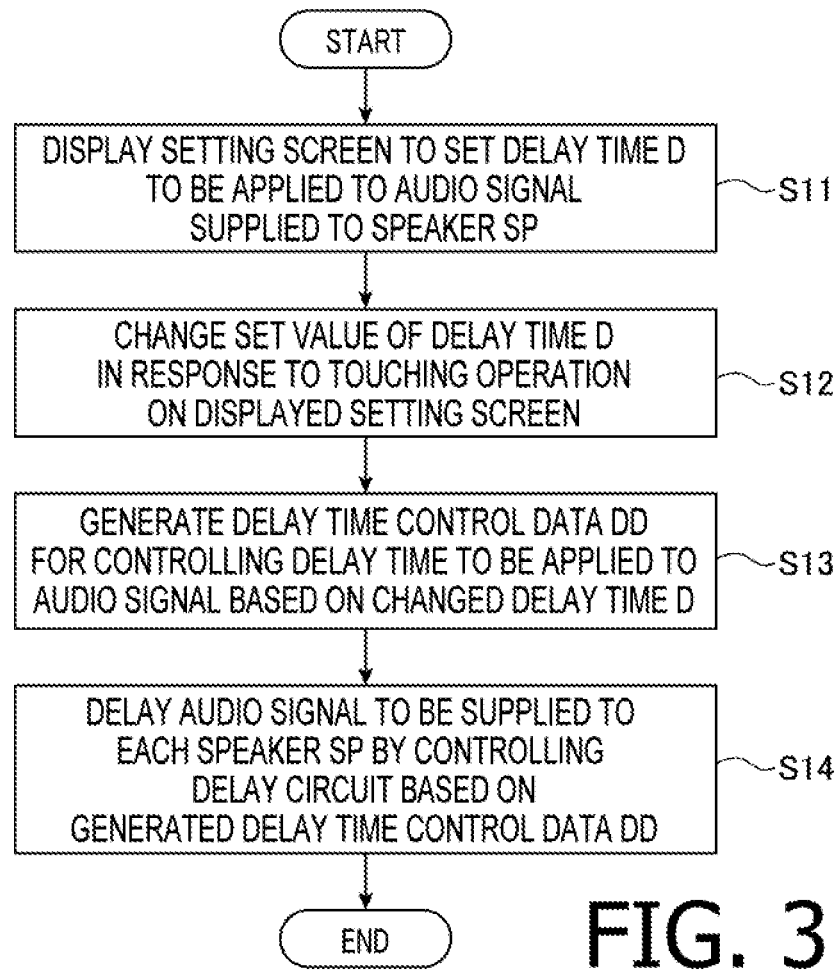
FIG. 3 shows a flowchart of a time alignment process which is performed in process example 1 (and process example 2) of the present invention, executed by the signal delay adjusting device to adjust the output timing of the sounds among the speakers.

The display part 22 is, for example, a touch panel display. For example, when a user sitting in the driver's seat touches a menu screen or the like displayed on the display screen of the display part 22, execution of the time alignment process is started. FIG. 3 is a flowchart showing the time alignment process executed by the signal delay adjustment device 10. Hereinafter, for convenience, a user who sits in the driver's seat will be referred to as a "user U".

Process Example 1

Figure 4:
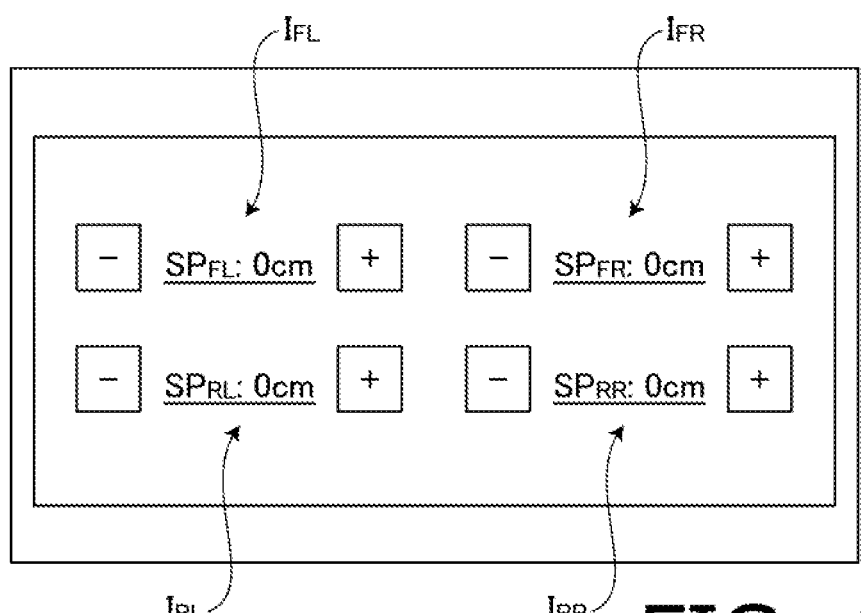
FIG. 4 is a figure showing an example of a setting screen, which is used for setting the delay time applied to the audio signal for each speaker in process example 1 of the present invention, displayed on the display screen of the display part provided in the signal delay adjusting device.

As shown in FIG. 3, when the execution of the time alignment process is started, the microcomputer 12 displays a setting screen for changing the setting of the delay time D for each speaker SP on the display screen of the display part 22 in step S11. FIG. 4 shows an example of a setting screen displayed on the display screen of the display part 22 as step S11 is executed.

In the present embodiment, there are three types of setting screens for changing the delay tune D. Here, the time alignment process which is executed using one of them (a setting screen shown in FIG. 4, hereinafter referred to as a "first time alignment setting screen" for convenience) will be described. The time alignment process executed using the first time alignment setting screen will be referred to as a "process example 1".

As shown in FIG. 4, icon parts $I_{FR}$, $I_{FL}$, $I_{RR}$ and $I_{RL}$ are displayed on the first time alignment setting window. Each of the icon parts $I_{FR}$, $I_{FL}$, $I_{RR}$ and $I_{RL}$ is for changing the delay time $D_{FR}$, $D_{FL}$, $D_{RR}$, and $D_{RL}$, and has a plus icon (icon of "+" symbol in the figure) for increasing the delay time D and a minus icon (icon of "−" symbol in the figure) for decreasing the delay time D. In the first time alignment setting screen, the delay time D is displayed in terms of distances (unit: cm), but in another embodiment, the delay time D itself (unit: msec) may be displayed. At the time of product shipment of the signal delay adjustment device 10, each delay time D is set to a default value (e.g., D=0).

When the user U touches the plus icon or the minus icon of the icon parts I, a predetermined control signal is input from the displaying part 22 to the microcomputer 12. The microcomputer 12 changes the set value of the delay time D based on the input control signal (step S12). For example, each time the plus icon of the icon part $I_{FR}$ is touched once, the microcomputer 12 changes the delay time $D_{FR}$ by a fixed delay time (e.g., 0.3 msec) based on the control signal. When the user U touches the plus icon or the minus icon of each icon part I, the delay time D is changed for each speaker SP. Hereinafter, for convenience, the delay time of the fixed value is referred to as a "fixed delay time DF".

Further, in the present process example 1, when, for example, the plus icon or minus icon of the icon part I is long-pressed by the user U (continued to be pressed (touched) for a predetermined time or more), the display part 22 outputs the control signal carrying the number of pulses corresponding to the time during which the plus icon or minus icon is long-pressed to the microcomputer 12. When the control signal having n (n being a natural number) pulses is input, the microcomputer 12 determines that the plus icon or the minus icon has been touched n times, and changes the delay time D by a delay time which is n times the fixed delay time DF.

The microcomputer 12 notifies the DSP 14 of the change amount of the delay time D (in other words, the delay time D after the setting has been changed). The DSP 14 generates data (hereinafter referred to as "delay time control data") for controlling the delay time to be applied to the audio signal based on the change amount of the delay time D (step S13).

Generation of the delay time control data is performed by the data generating part 142 included in the DSP 14. The data generating part 142 is a digital signal processing circuit including a first order Butterworth low-pass filter, and generates the delay time control data based on the amount of change in the delay time D notified by the microcomputer 12. The delay time control data is data indicating a change of the delay time D on a time axis. Hereinafter, for convenience, the delay time control data corresponding to the speakers $SP_{FR}$, $SP_{FL}$, $SP_{RR}$ and $SP_{RL}$ will be referred to as delay time control data $DD_{FR}$, $DD_{FL}$, $DD_{RR}$ and $DD_{RL}$, respectively.

Figure 5A:
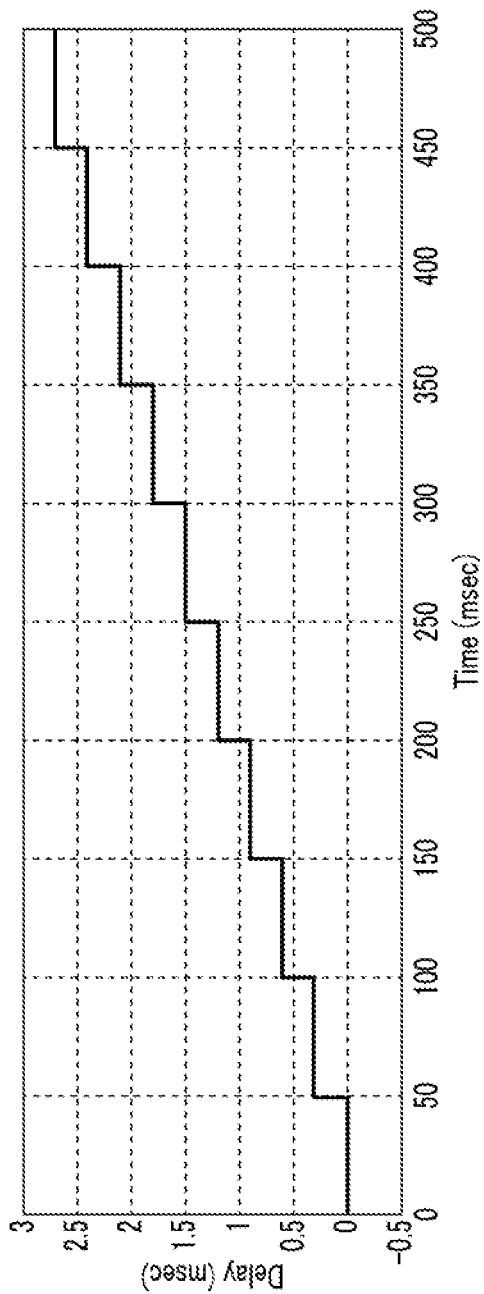
FIG. 5A is a figure showing initial data of delay time control data, which is used for controlling the delay time applied to the audio signal in the process example 1 of the present invention, generated by a data generating part provided in the signal delay adjusting device.

When the change amount of the delay time D, i.e., the delay time n times the fixed delay time DF) is notified by the microcomputer 12, the data generating part 142 generates initial data of the delay time control data DD based on the change amount. FIG. 5A shows a graph indicating the initial data generated by the data generating part 142. In FIG. 5A, the vertical axis represents the delay time D (unit: msec) and the horizontal axis represents the elapsed time (unit: msec).

The data generating part 142 generates, as initial data, data indicating a change in the delay time D on the time axis, and indicating that the delay time D increases (or decreases) by the fixed delay time DF every time a predetermined time elapses until the delay time D after the setting has been changed.

For the sake of convenience, a time interval between the timings at which the change (increase or decrease) of the delay time D is started (an interval of the predetermined time) is referred to as a "control time interval". In the example shown in FIG. 5A, the fixed delay time DF and the control time interval DF are 0.3 msec and 50 msec, respectively. Further, as the plus icon is long-pressed by the user U, the control signal carrying 9 pulses is input from the display part 22 to the microcomputer 12. Therefore, the amount of change of the delay time D is 2.7 msec (0.3 msec×9).

Figure 5B:
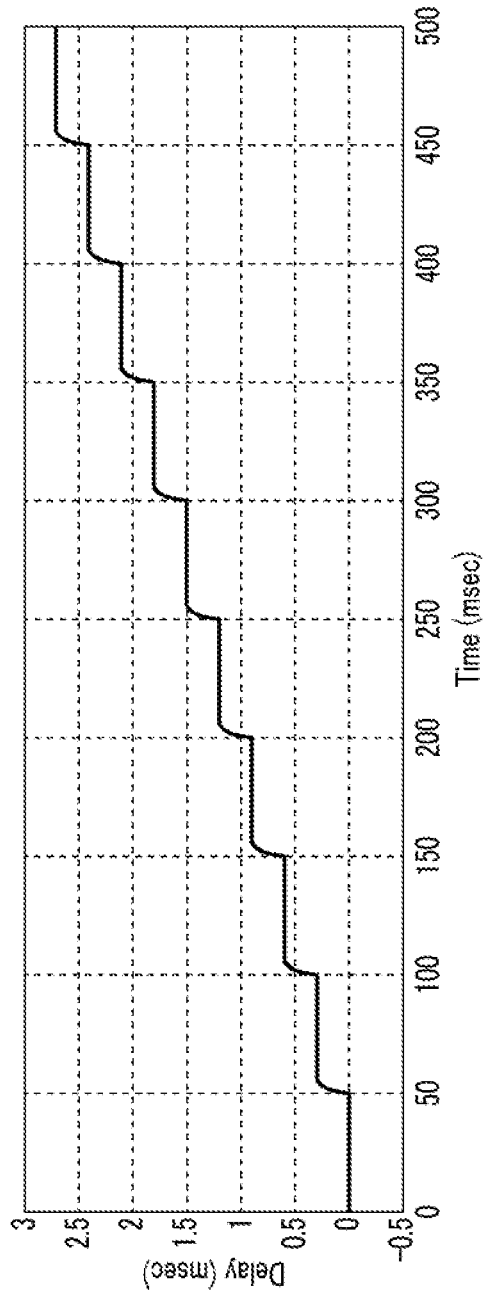
FIG. 5B is a figure showing the delay time control data obtained by smoothing the initial data shown in FIG. 5A.

The data generating part 142 smoothes the initial data with use of the first-order Butterworth low-pass filter (smoothing process). FIG. 5B shows a graph illustrating the delay time control data DD obtained by smoothing the initial data DD. In FIG. 5B, the vertical axis represents the delay time D (unit: msec) and the horizontal axis represents the elapsed time (unit: msec). In the example shown in FIG. 5B, a cutoff frequency of the first order Butterworth low-pass filter of the data generator 142 is 96 Hz and the sampling frequency the audio signal is 48 kHz.

As shown in FIG. 5A the initial data is configured such that the delay time D is immediately increased by the fixed delay time DF every time the control time interval elapses. On the other hand, the delay time control data DD is configured such that the delay time D is increased by the fixed delay time DF over a predetermined time every time the control time interval elapses, as shown in FIG. 5B.

The DSP 14 includes delay circuits $144_{FR}$, $144_{FL}$, $144_{RR}$ and $144_{RL}$ for delaying audio signals to be supplied to the speaker $SP_{FR}$, $SP_{FL}$, $SP_{RR}$ and $SP_{RL}$, respectively. The DSP 14 controls the delay circuit 144 based on the delay time control data DD generated by the data generating part 142 to delay the audio signals input from the reading part 24.

Concretely, when n=1 (when neither the plus icon nor the minus icon is long-pressed), the DSP 14 gradually changes the delay time D based on the delay time control data DD so that the delay time D increases (or decreases) by the fixed delay time DF over a predetermined time. When n=2 or more (when the plus icon or the minus icon is long-pressed), the DSP 14 increases (or decreases) the delay time D applied to the audio signal by the fixed delay time DF every time the control time interval elapses until the delay time D reaches the delay time D after the setting has been changed (n times the fixed delay time DF) based on the delay time control data DD, and gradually changes the delay time D within each control time interval such that the delay time D increases (or decrements) by the fixed delay time DF over a predetermined time.

The audio signals delayed by the delay circuit 144 are output as sounds from the respective speakers SP via the mute circuit 16 and the output circuit 18. As the output timings of the sounds change among the speakers SP in accordance with the delay time D set for each speaker SP, the order in which the sounds output from the respective speakers SP reach the ears of the user U and the time differences among the sounds reaching the ears of the user U change. Therefore, the localization of the sound image perceived by the user U changes. The user U can set the delay times D by touching the first time alignment setting screen until, for example, the sound image is localized at a desired position.

As described above, in the present embodiment, since the delay time D is gradually changed over a predetermined period of time based on the delay time control data DD, a change in the phase rotation speed of the audio signal at the time of changing the delay time D is suppressed. As a result, distortion of the audio signal is suppressed, and generation of abnormal sounds due to distortion of the audio signal is suppressed. At the same time, as occurrence of abnormal sounds due to the distortion of the audio signal is suppressed, the sound output from the speaker SP is not interrupted before and after the change of the delay time D due to the muting (the sound is output from the speaker SP while being gradually delayed). Therefore, the user U can easily perceive a change in the position of the sound image before and after the change of the delay time D (i.e., the virtual image of the sound perceived by the user U) as compared with the conventional case.

When a state of the audio signal prior to the application of the delay time D is referred to as a first state and a state of the audio signal after the application of the delay time D is referred to as a second state, it can be said that the DSP 14 is a signal processing part which changes the state of the audio signal supplied to each speaker SP from the first state to the second state, and gradually changes the state of the audio signal from the first state to the second state over a predetermined period of time so that distortion of the audio signal which occurs temporarily as the state of the audio signal changes from the first state to the second state is suppressed.

Figure 6A:
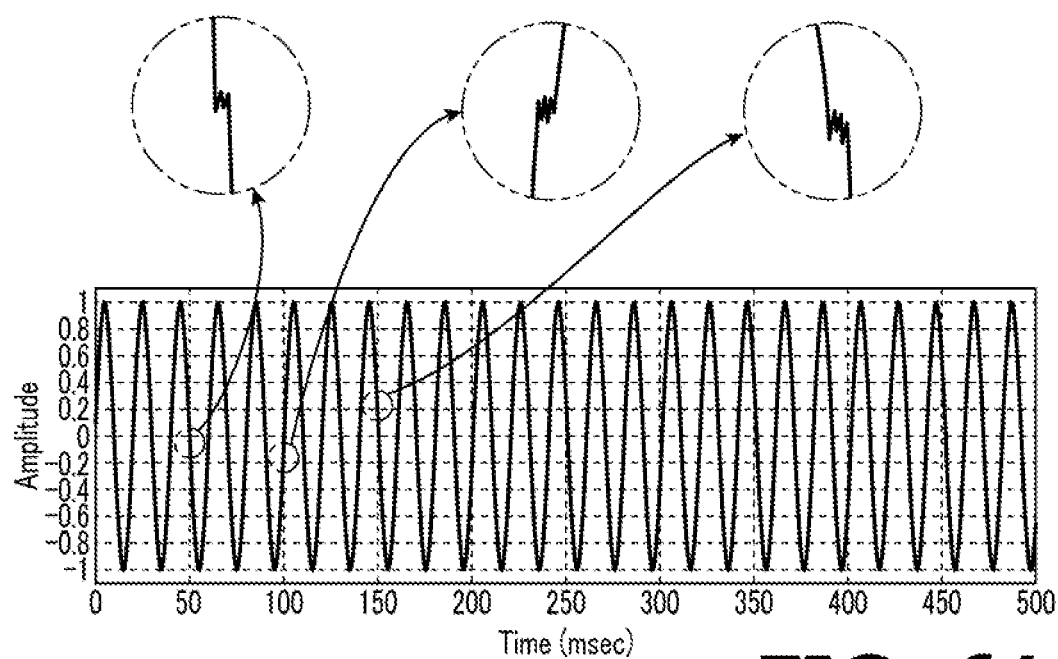
FIG. 6A is a figure showing a waveform of a test signal supplied to the speaker when delaying the test signal based on the initial data shown in FIG. 5A.
Figure 6B:
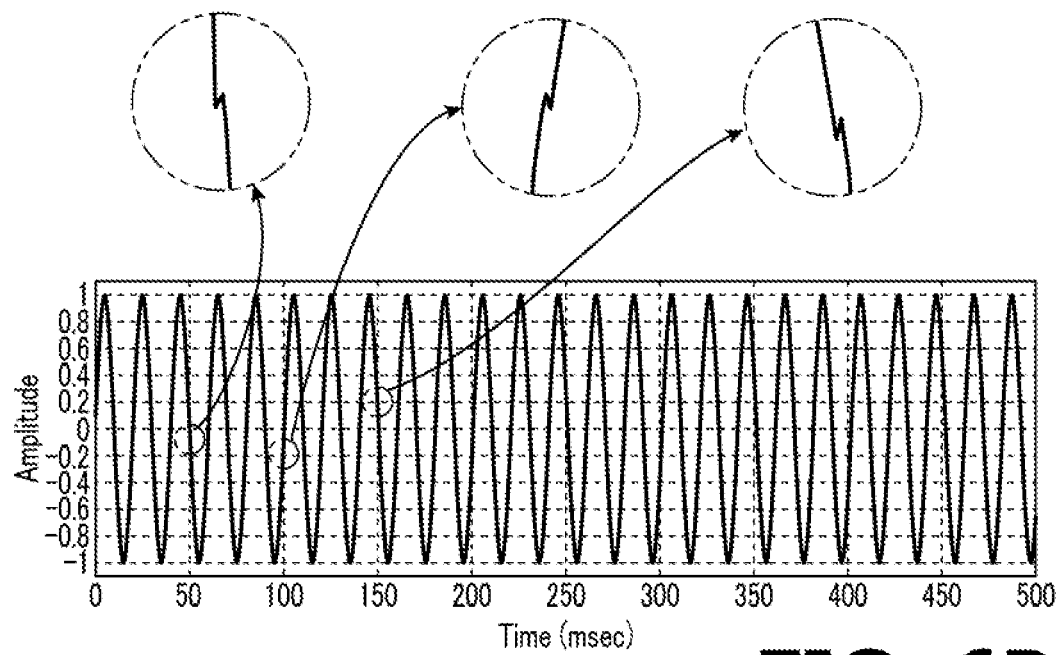
FIG. 6B is a figure showing a waveform of the test signal supplied to the speaker when delaying the test signal based on the delay time control data shown in FIG. 5B.
Figure 7A:
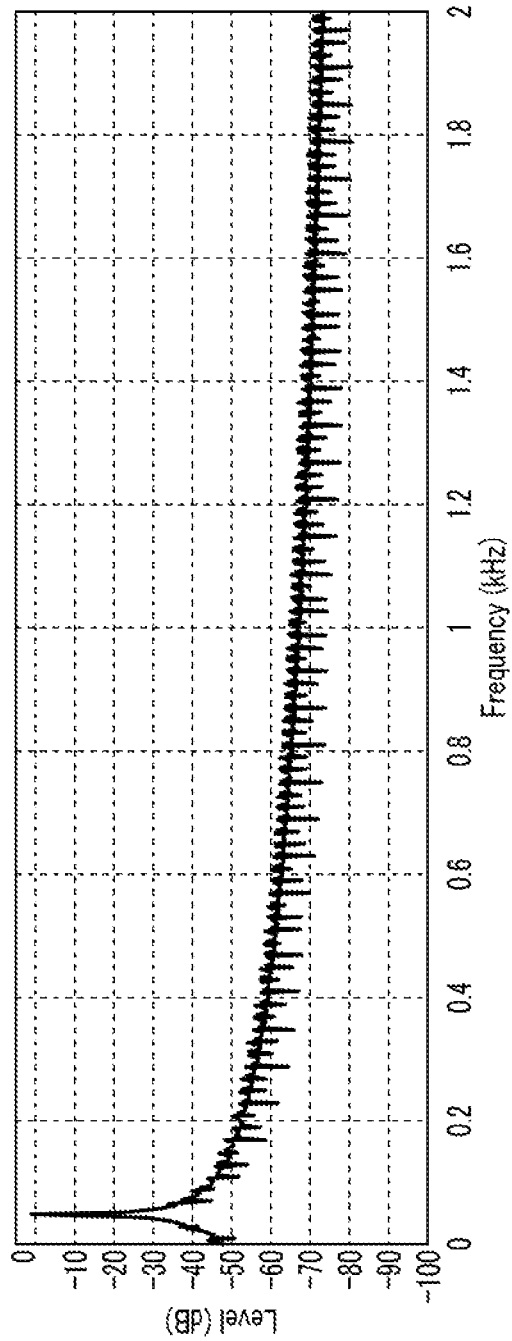
FIG. 7A is a figure showing a frequency characteristic of the test signal shown in FIG. 6A.
Figure 7B:
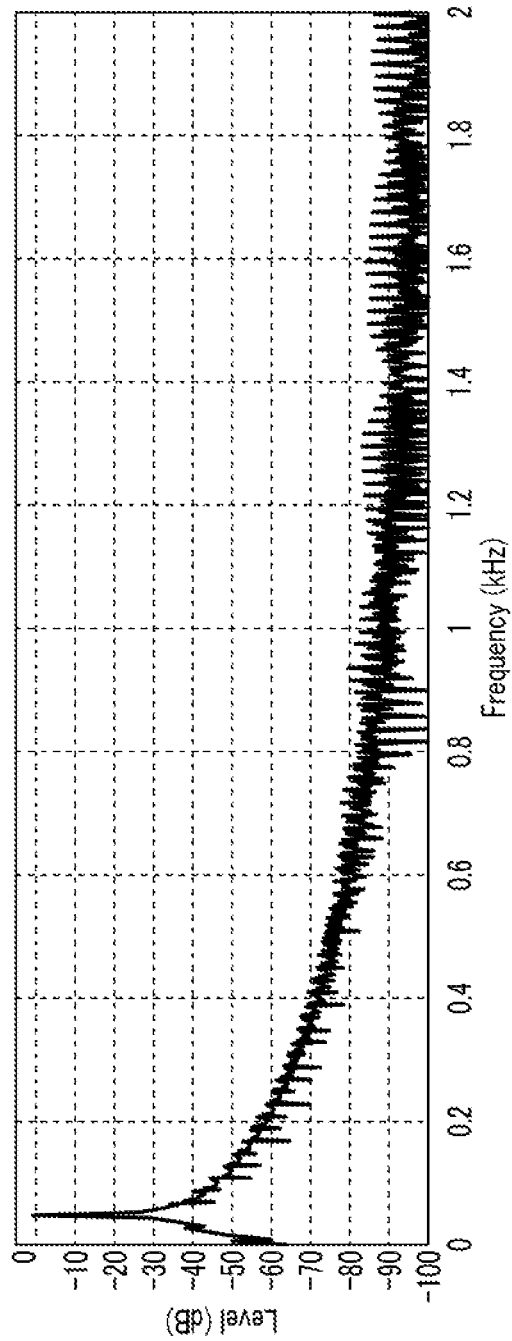
FIG. 7B is a figure showing a frequency characteristic of the test signal shown in FIG. 6B.

FIG. 6A shows a waveform of a test signal to be supplied to the speaker SP when the test signal is delayed based on the initial data shown in FIG. 6A. FIG. 6B shows a waveform of a test signal to be supplied to the speaker SP when the test signal is delayed based on the delay time control data DD shown in FIG. 5B. The test signal above is a 50 Hz sinusoidal audio signal. For the same of description, in FIGS. 6A and 6B, the waveforms of the test signals at the time when the delay time D is changed (e.g., 50 msec, 100 msec and 150 msec) are shown in an enlarged manner. FIG. 7A and FIG. 7B show frequency characteristics of the test signals shown in FIG. 6A and FIG. 6B, respectively.

When the test signal is delayed on the basis of the initial data, the test signal is distorted as the phase rotational velocity of the test signal changes abruptly when the delay time D is changed (see the enlarged views in FIG. 6A). On the other hand, when the test signal is delayed on the basis of the delay time control data DD, a change in the phase rotational velocity of the test signal at the time of changing the delay time D is suppressed, and distortion of the test signal is suppressed (see the enlarged views in FIG. 6B).

Comparing FIG. 7A and FIG. 7B, it can be seen that when the test signal is delayed based on the delay time control data DD, the harmonics superimposed on the test signal are suppressed as compared with a case where the test signal is delayed based on the initial data DD. In particular, in the former case, compared with the latter case, harmonics in the middle band (1 kHz-2 kHz) in which human auditory sensitivity is high are suppressed by about 20 dB, and it is understood that abnormal sounds are effectively suppressed.

In the present embodiment, the control time interval is set to a short time interval in order to speed up a response (a time interval required from the touching operation of the plus icon or the minus icon to the delay time D reaching the delay time D after the setting has been changed).

The control time interval may be shortened to, for example, a minimum time interval required for the delay time D to increase (or decrease) by the fixed delay time DF within each control time interval. For example, in the example shown in FIG. 5B, the control time interval may be shortened to 10 msec. By setting the control time interval to 10 msec, the response can be made quicker. The user U can change the setting of the control time interval by a touch operation on the operation part 20 or the displaying part 22.

Process Example 2

Next, a time alignment process performed using a second time alignment setting screen (process example 2) will be described. The time alignment processing according to the process example 2 will be described with reference to a flowchart shown in FIG. 3.

Figure 8:
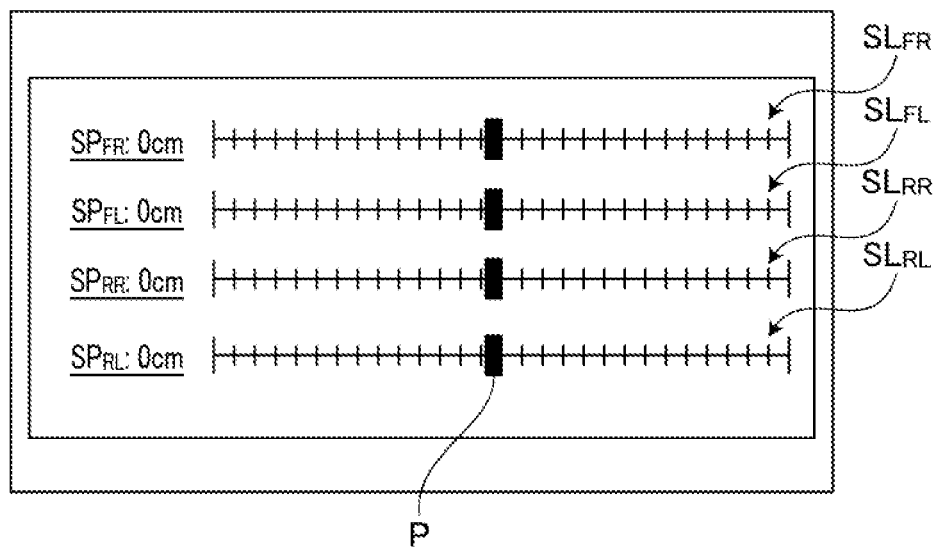
FIG. 8 is a figure showing an example of a setting screen, which is displayed on the display screen of the display part, for setting the delay time to be applied to the audio signal for each speaker.

When the execution of the time alignment process is started, the microcomputer 12 displays a second time alignment setting screen on the display screen of the display part 22 (step S11). FIG. 8 shows an example of the second time alignment setting screen displayed on the display screen of the display part 22 according to the process example 2.

As shown in FIG. 8, slider parts $SL_{FR}$, $SL_{FL}$, $SL_{RR}$ and $SL_{RL}$ are displayed on the second time alignment setting screen. The slider parts $SL_{FR}$, $SL_{FL}$, $SL_{RR}$ and $SL_{RL}$ are used to change the delay times $D_{FR}$, $D_{FL}$, $D_{RR}$ and $D_{RL}$, and have pointers P, respectively.

When the user U slides the pointer P, a control signal corresponding to the slide operation is input from the display part 22 to the microcomputer 12. The microcomputer 12 changes the setting value of the delay time D based on the input control signal (step S12).

When the pointer P is slid rightward with respect to the current position, a control signal for increasing the delay time D is input to the microcomputer 12. When the pointer P is slid leftward with respect to the current position, a control signal for decreasing the delay time D is input to the microcomputer 12. As the amount of sliding of the pointer P is larger, a control signal for changing the delay time D to the greater extent is input to the microcomputer 12.

For example, when the pointer P of the slider part $SL_{FR}$ is slid rightward by three graduations, the microcomputer 12 increases the delay time $D_{FR}$ by a delay time corresponding to the slid amount (e.g., 3 msec). For further example, when the pointer P the slider part $SL_{FR}$ is slid rightward by six graduations, the microcomputer 12 increases the delay time $D_{FR}$ by a delay time corresponding to the slid amount (e.g., 6 msec). As the pointer P of each slider part SL is slid by the user U, the setting of the delay time D for each speaker SP is changed.

When the change amount of the delay time D (i.e., the delay time corresponding to the slide direction and the slide amount) is notified from the microcomputer 12, the data generating part 142 generates initial data of the delay time control data DD based on the change amount. The initial data generated at this time is shown in FIG. 9A.

The data generating part 142 then generates the delay time control data DD by smoothing the initial data with use of the first order Butterworth low-pass filter (smoothing process) (step S13). The delay time control data DD generated at this time is shown in FIG. 9B.

Figure 9A:
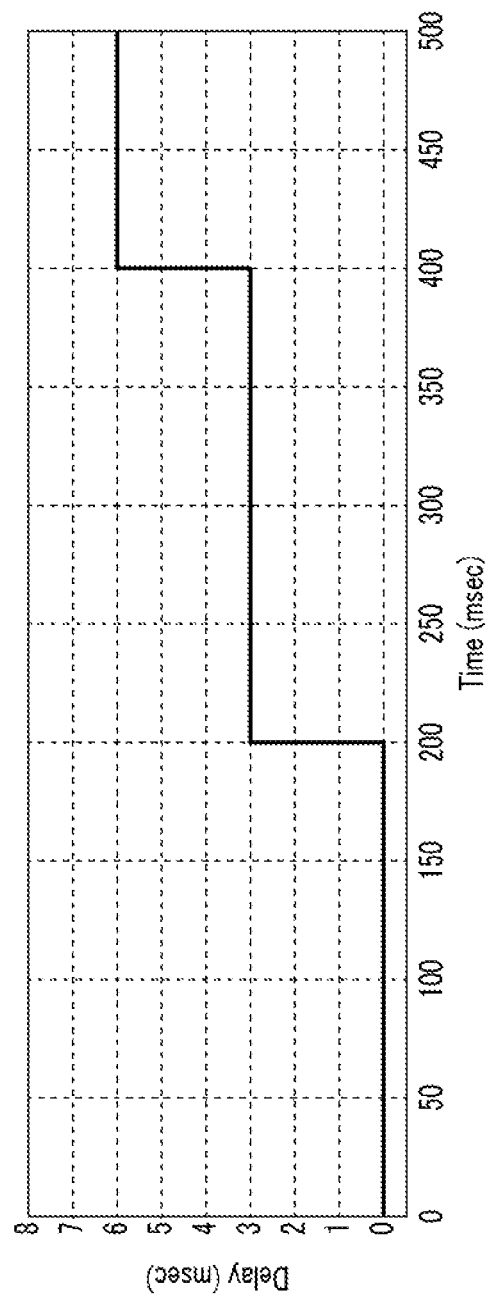
FIG. 9A is a figure showing initial data of delay time control data generated by the data generating unit in process example 2 of the present invention.
Figure 9B:
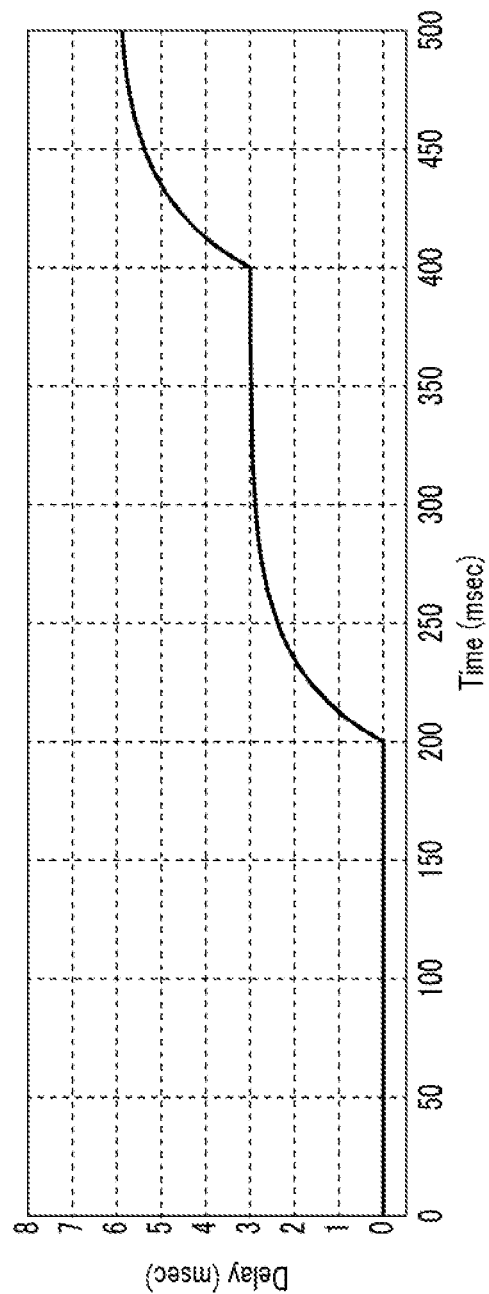
FIG. 9B is a figure showing delay time control data obtained by smoothing the initial data shown in FIG. 9A.

In the examples shown in FIG. 9A and FIG. 9B, the change amounts of the delay time D and the control time interval are 6 msec and 200 msec, respectively. Further, in the example shown in FIG. 9B, the cutoff frequency of the first order Butterworth low-pass filter provided to the data generating part 142 is 4.8 Hz, and the sampling frequency of the audio signal is 48 kHz.

The DSP 14 controls the delay circuit 144 based on the delay time control data DD generated by the data generating part 142 to apply the delay to the audio signal input from the reader 24 (step S14).

In the present process example 2, the change amount of the delay time D is larger than that in the process example 1. Therefore, in the present process example 2, the phase rotation speed of the audio signal changes more abruptly when the delay time D is changed, and the audio signal is distorted more greatly than in the process example 1. Therefore, the data generating part 142, as compared with the process example 1, sets the cutoff frequency of the first order Butterworth low-pass filter to a low value, thereby generating the delay time control data DD in which the smoothing amount is larger. As a result, the delay time control data DD changes the delay time D more gently (i.e., gradually with spending longer time) as compared with the process example 1.

The DSP 14 gradually changes the delay time D based on the delay time control data DD so that the delay time D increases (or decreases) in accordance with the slid amount over a predetermined time.

In the example shown in FIG. 9B, the delay time D is changed by 3 msec per every 200 msec (control time interval). However, in another embodiment, the delay time D may be changed without employing the control time interval. In this case, the DSP 14 sets the cutoff frequency of the first order Butterworth low-pass filter to a value below 4.8 Hz. The data generating part 142 generates the delay time control data DD that changes the delay time D more gradually as the cutoff frequency of the first order Butterworth low-pass filter is set to a value lower than 4.8 Hz. Based on the delay time control data DD, the DSP 14 gradually changes the delay time to be applied to the audio signal over about 400 msec until the delay time D increases, for example, by 6 msec.

In the present process example 2, the DSP 14 sets the cutoff frequency of the first-order Butterworth low-pass filter to a lower value as the sliding amount of the point P (that is, the amount of change in the delay time D) is larger. For example, when the pointer P is slid rightward by six graduations and when the pointer P is slid rightward by three graduations the cutoff frequency of the first order Butterworth low-pass filter is set to a lower value in the former case. That is, the DSP 14 changes the delay time D more gradually (over a longer period of time) as it is likely that the audio signal is greatly distorted when the delay time D is changed. Therefore, even when the change amount of the delay time D is large, the distortion of the audio signal is suppressed, and it is possible to suppress the abnormal sound due to the distortion of the audio signal to the extent, for example, that the user U does not care about the abnormal sound.

Figure 10A:
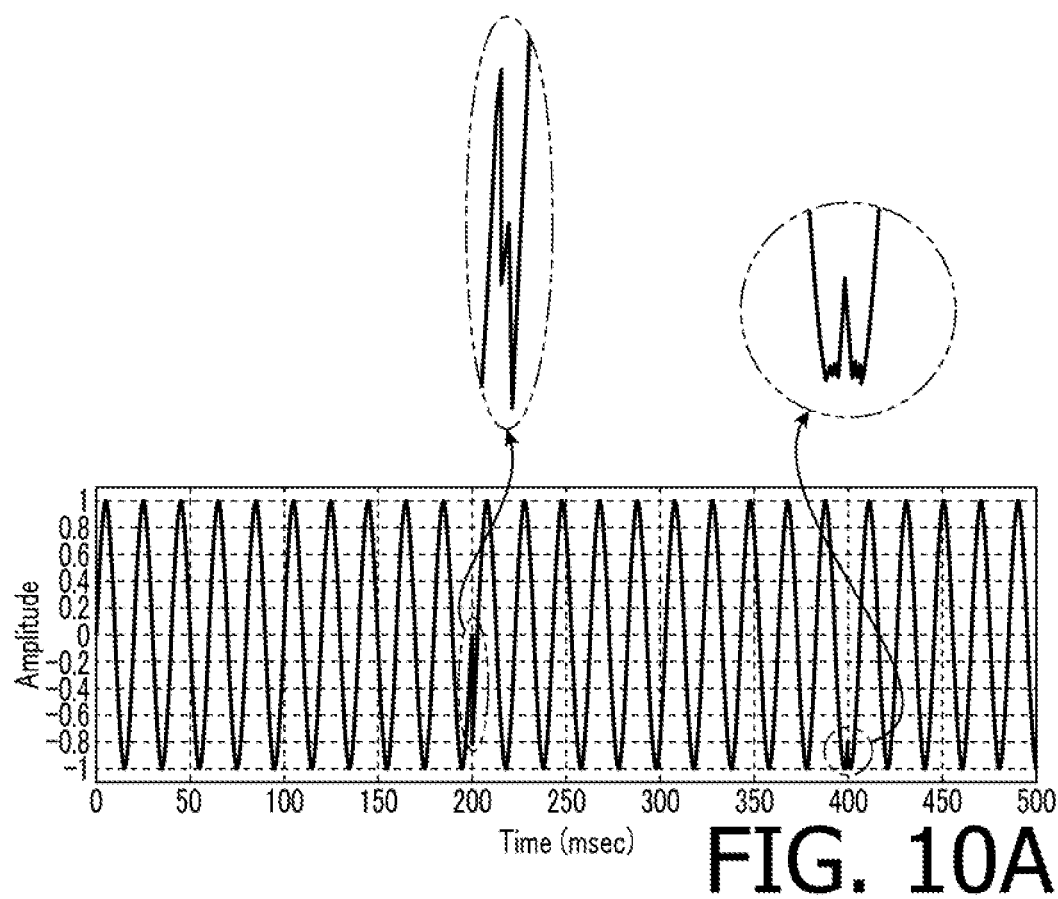
FIG. 10A is a figure showing a waveform of the test signal to be supplied to the speaker when delaying the test signal based on the initial data shown in FIG. 9A.
Figure 10B:
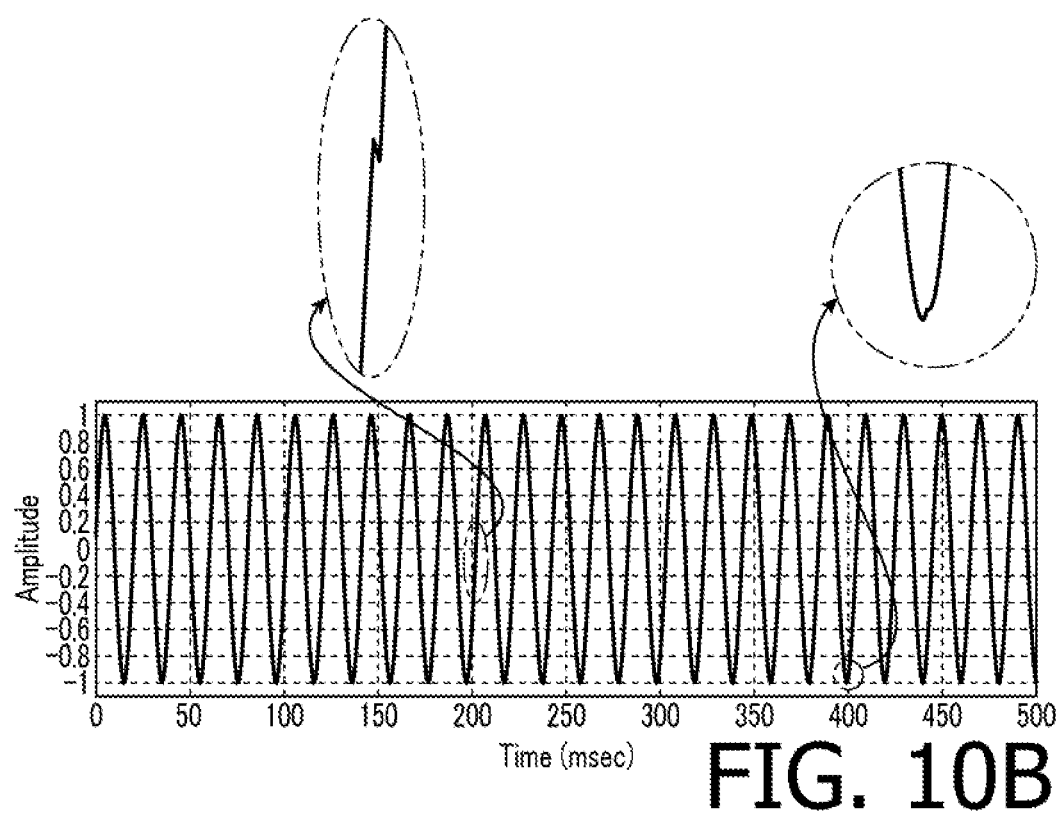
FIG. 10B is a figure showing a waveform of the test signal to be supplied to the speaker when delaying the test signal based on the delay time control data shown in FIG. 9B.
Figure 11A:
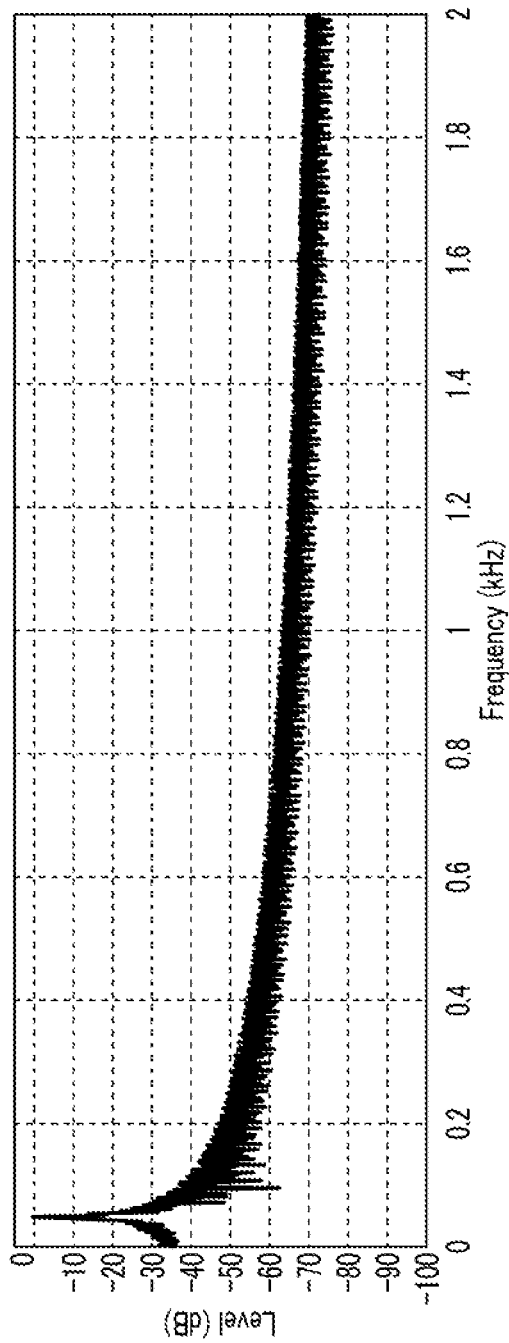
FIG. 11A is a figure showing a frequency characteristic of the test signal shown in FIG. 10A.
Figure 11B:
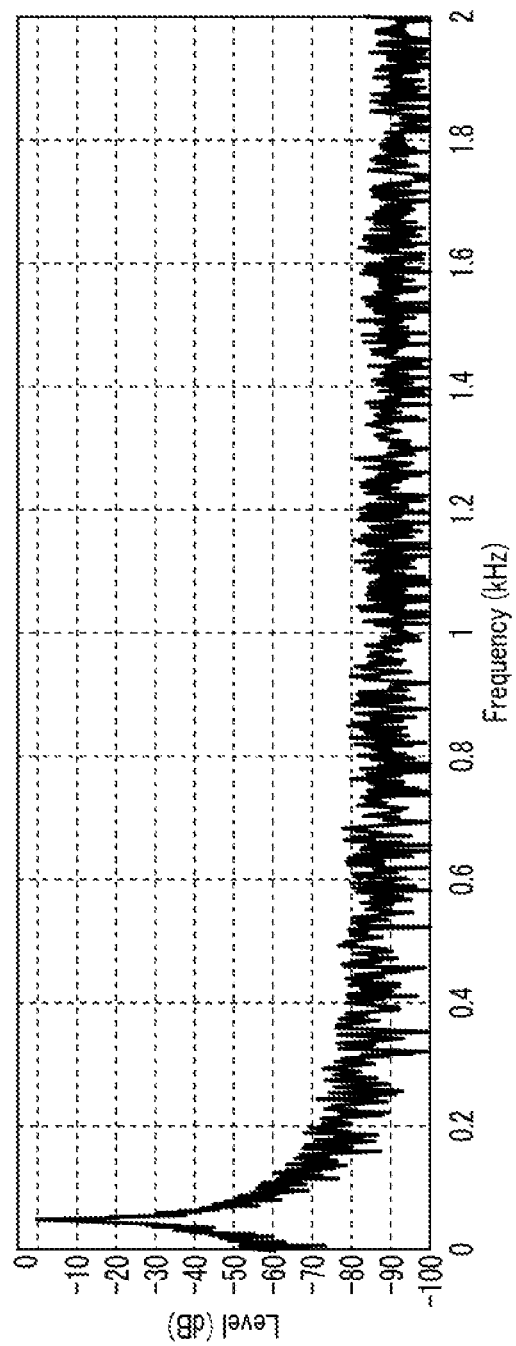
FIG. 11B is a figure slowing a frequency characteristic of the test signal shown in FIG. 10B.

Here, FIG. 10A shows a waveform of a test signal to be supplied to the speaker SP when the test signal is delayed based on the initial data shown in FIG. 9A, FIG. 10B shows a waveform of a test signal to be supplied to the speaker SP when the test signal is delayed based on the delay time control data DD shown in FIG. 9B. The test signal is a 50 Hz sinusoidal audio signal. For convenience, the waveforms of the test signals at the time when the delay time D is changed (200 msec and 400 msec) are enlarged in FIGS. 9A and 9B. FIGS. 11A and 11B show frequency characteristics of the test signals shown in FIGS. 10A and 10B, respectively.

When the test signal is delayed on the basis of the initial data, the test signal is distorted as the phase rotation speed of the test signal changes rapidly at the time of changing the delay time D (see each enlarged view in FIG. 10A). On the other hand, when the test signal is delayed based on the delay time control data DD, a change in the phase rotation speed of the test signal at the time of changing the delay time D is suppressed, and distortion of the test signal is suppressed (see each enlarged view in FIG. 10B).

Comparing FIG. 11A and FIG. 11B, it is understood that when the test signal is delayed based on the delay time control data DD, the harmonics superimposed on the test signal are suppressed as compared with the case where the test signal is delayed based on the initial data. In particular, in the former case, compared with the latter case, harmonics in the middle band (1 kHz-2 kHz) in which human auditory sensitivity is high are suppressed by about 20 dB, and it is understood that abnormal sounds are effectively suppressed.

Process Example 3

Figure 12:
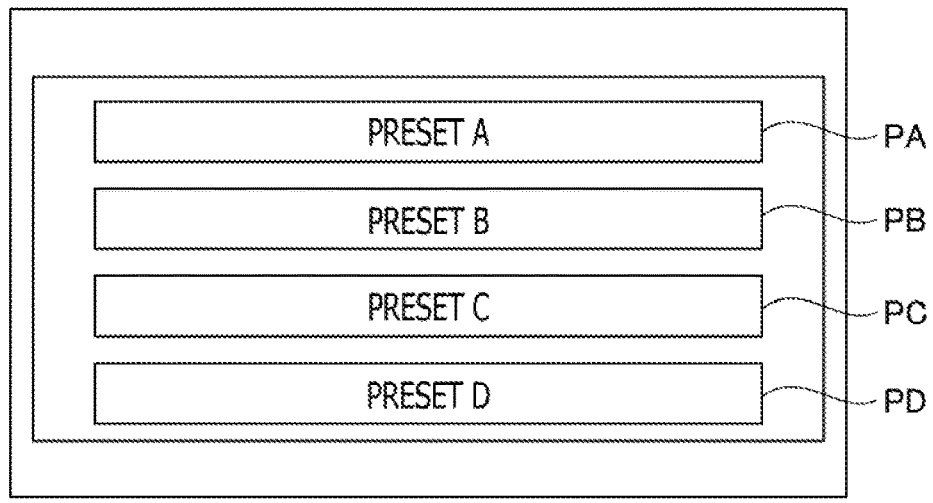
FIG. 12 is a figure showing an example of a setting screen, which is displayed on the display screen of the display part, for setting the delay time to be applied to the audio signal for each speaker in the process example 3 of the present invention.
Figure 13:
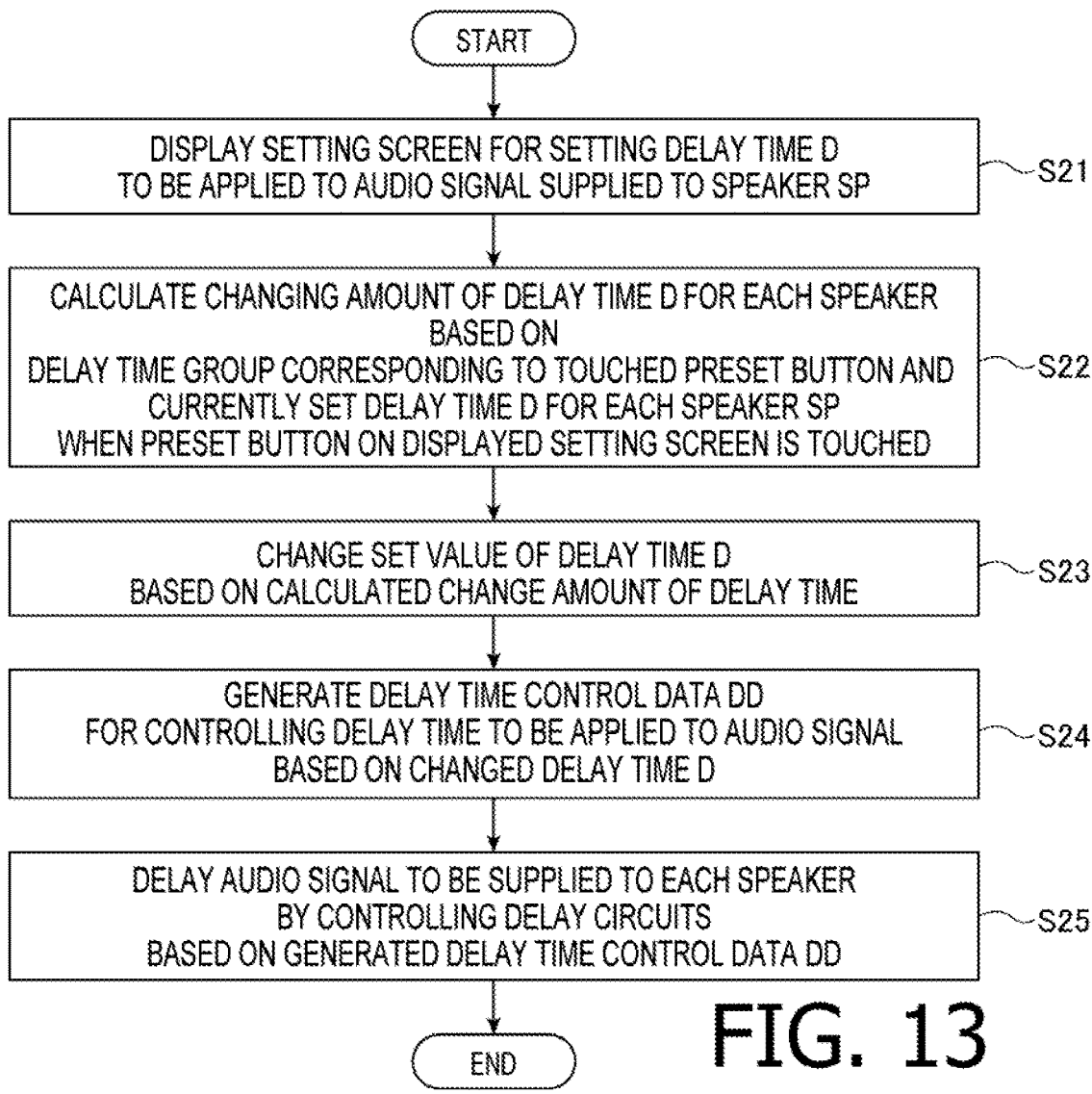
FIG. 13 is a flowchart showing a time alignment process performed by the signal delay adjusting device in the process example 3 of the present invention.

Next, a time alignment process (process example 3) to be executed using a third time alignment setting screen will be described. FIG. 12 shows an example of a third time alignment setting screen displayed on the display screen of the display part 22 in the process example 3. FIG. 13 is a flowchart showing the time alignment processing according to the process example 3.

When the execution of the time alignment process is started, the microcomputer 12 displays the third time alignment setting screen on the display screen of the display part 22 (step S21). As shown in FIG. 12, preset buttons PA-PD are displayed on the third time alignment setting screen (the preset setting screen). The preset buttons PA-PD correspond to the preset memories 26A-26D, respectively.

In the process example 3, a delay time group corresponding to the driver's seat inside the vehicle A is stored in advance in the preset memory 26A. The delay time group corresponding to the driver's seat in the vehicle A is a set of delay times D to be applied to the audio signals supplied to the speakers $SP_{FR}$, $SP_{FL}$, $SP_{RR}$ and $SP_{RL}$, and is set in advance so that the sound output from each of the speakers SP reaches the position of the driver's seat in the vehicle A at the same time. The preset memories 26B-26D store in advance delay time groups corresponding to the positions of the passenger seat, the right rear seat and the left rear seat in the vehicle A, respectively.

The respective delay lime groups are stored in the respective preset memories 26, for example, at the time of product shipment of the signal delay adjustment device 10. Each delay time group may be set by the user in the vehicle cabin touching the first time alignment setting screen or the second time alignment setting screen and stored in each preset memory 26.

When one of the preset buttons PA-PD is touched (i.e., when it is instructed to set the delay time D for each speaker SP using the delay time group corresponding to the touched preset button), the microcomputer 12 calculates a change amount of the delay time D for each speaker SP based on the delay time group corresponding to the touched preset button and the currently set delay time D for each speaker SP (step S22).

Concretely, the microcomputer 12 calculates a difference between the currently set delay time D and the delay time set in the delay time group for each speaker SP. This difference indicates the amount of change in the delay time D. The microcomputer 12 changes the set value of the delay time D based on the calculated change amount of the delay time D (step S23).

The data generating part 142, as in the process example 2, when the amount of change in the delay time D is notified from the microcomputer 12, generates the initial data of the delay time control data DD based on the amount of change, generates the delay time control data DD by smoothing the generated initial data with use of the first order Butterworth low-pass filter (smoothing process) (step S24). That is, as the amount of change in the delay time D is larger, the data generating part 142 sets the cutoff frequency of the first order Butterworth low-pass filter to a lower value, thereby generating the delay time control data DD employing a large smoothing amount (data in which the delay time D is gradually change over a longer time).

The DSP 14 controls the delay circuit 144 based on the delay time control data DD generated by the data generator 142 to delay the audio signals input from the reader 24 (step S25).

By executing such process, for example, even when the delay time D is largely changed by using the delay time group stored in the preset memory, distortion of the audio signal can be suppressed, and occurrence of abnormal sound due to distortion of the audio signal can be suppressed.

In the process example 3, the user in the vehicle cabin can set the delay time for each speaker SP collectively (easily) by using the delay time group stored in advance in each preset memory 26. Further, when the user is seated, for example, in the driver's seat, the user can make the sound image generated by the sound output from each speaker SP be localized to an appropriate position (e.g., a front position of the user) by simple operations of causing the third time alignment setting screen to be displayed on the display screen of the display part and touching the preset button PA.

The foregoing is a description of exemplary embodiments of the present invention. The embodiments of the present invention are not limited to those described above, and various modifications are possible within the scope of the technical idea of the present invention. For example, contents appropriately combining embodiments exemplarily specified in the specification or obvious embodiments are also included in embodiments of the present application.

What is claimed is:

1. A signal delay adjustment device configured to adjust output timings of sounds among a plurality of speakers by individually setting delay times, of audio signals to be supplied to the plurality of speakers, to changed delay times, and individually delay the audio signals to be supplied to the plurality of speakers with the changed delay times, the signal delay adjustment device comprising:
   a setting part configured to individually set the changed delay time to be applied to the audio signal for each speaker of the plurality of speakers;
   a control data generating part configured to generate control data based on a change amount that is a difference between an existing delay time and the changed delay time, the control data indicating a relationship between the change amount and a predetermined time for applying the changed delay time to the audio signal, the predetermined time is a longer time as the change amount is larger; and
   a delay part configured to individually delay the audio signals to be supplied to the plurality of speakers based on the control data generated by the control data generating part,
   wherein the delay part gradually changes the delay times applied to the audio signals over the predetermined time so that the delay time applied to each of the audio signals is changed from the existing delay time to the changed delay time over the predetermined time.

2. The signal delay adjustment device according to claim 1,
   further comprising an input part configured to allow a user to input the change amount of the delay time to be applied to the audio signal for each speaker,
   wherein the setting part is configured to set the changed delay time to be applied to the audio signal for each speaker based on the change amount input by the user to the input part.

3. The signal delay adjustment device according to claim 2,
   wherein the input part is configured to allow the user to input an arbitrary value as the change amount of the delay time to be applied to the audio signal for each speaker,
   wherein the setting part is configured to set the changed delay time to be applied to the audio signal for each speaker based on the arbitrary value input through the input part.

4. The signal delay adjustment device according to claim 2,
   wherein the input part is configured to allow a user to input a predetermined fixed value as the change amount of the delay time to be applied to the audio signal for each speaker, and
   wherein the setting part is configured to set the changed delay time to be applied to the audio signal for each speaker by the delay time of the predetermined fixed value based on an input by the user through the input part.

5. The signal delay adjustment device according to claim 1,
   further comprising:
   a storage part configured to store the delay time for each speaker in advance;
   an instruction part configured to instruct whether to set the delay time stored in the storage part for each speaker as the delay time to be applied to the audio signal for each speaker; and
   a calculation part configured to calculate the change amount of the delay time to be applied to the audio signal for each speaker based on the delay time for each speaker stored in the storage part and the existing delay time for each speaker when it is instructed by the instruction part to set the delay time for each speaker stored in the storage part as the delay time to be applied to the audio signal for each speaker, wherein the setting part changes the set value of the delay time to be applied to the audio signal for each speaker based on the change amount of the delay time calculated by the calculation part.

6. The signal delay adjustment device according to claim 5, the signal adjustment device being installed in a vehicle, wherein the delay time stored in the storage part for each speaker is set in advance so that sounds output from respective speakers simultaneously reach a predetermined seat position in the vehicle.

7. A signal processing device comprising:

a signal processing part configured to change a state of an audio signal to be applied to a speaker from a first state to a second state, wherein the signal processing part gradually changes the audio signal from the first state to the second state over a predetermined period of time so that distortion of the audio signal, which temporarily occurs when the state of the audio signal changes from the first state to the second state, is suppressed; and a control data generating part configured to generate control data based on a change amount that is a difference between the audio signal in the second state and the audio signal in the first state, the control data indicating a relationship between the change amount and the predetermined period of time for changing the audio signal from the first state to the second state, the predetermined period of time is a longer time as the change amount is larger, wherein the signal processing part is configured to individually delay audio signals to be supplied to a plurality of the speakers based on the control data generated by the control data generating part, and wherein the audio signal in the second state is a signal which is the audio signal provided with a predetermined amount of delay with respect to the audio signal in the first state.

8. The signal processing device according to claim 7, further comprising a setting part configured to change a delay time to be applied to the audio signal for each speaker, wherein the signal processing part gradually changes the state of the audio signal from the first state to the second state such that the delay time applied to the audio signal is changed from an existing delay time to a changed delay time set by the setting part over the predetermined period of time.

9. The signal processing device according to claim 7, wherein the signal processing part is configured to adjust output timings of sounds emitted from the plurality of speakers relative to each other by individually delaying the audio signals to be supplied to the plurality of speakers.

10. A signal delay adjustment method for adjusting the output timings of sounds among a plurality of speakers by individually setting delay times, of the audio signals to be supplied to the plurality of speakers, to changed delay times and individually delaying the audio signals supplied to the plurality of speakers by the changed delay times, the method causing a predetermined device to perform:

a setting step of individually setting the changed delay times to be applied to the audio signals for each speaker of the plurality of speakers;

a generating step of generating control data based on a change amount that is a difference between an existing delay time and the changed delay time, the control data indicating a relationship between the change amount and a predetermined time for applying the changed delay time to the audio signal, the predetermined time is a longer time as the change amount is larger; and a delaying step of individually delaying the audio signals to be supplied to the plurality of speakers based on the control data generated from the generating step, wherein, in the delaying step, the delay time applied to the audio signals are gradually changed over the predetermined time so that the delay time applied to each of the audio signals is changed from the existing delay time to the changed delay time over the predetermined time.

11. The signal delay adjustment method according to claim 10, wherein, when the change amount of the delay time to be applied to the audio signal for each speaker is input by a user operating the predetermined apparatus:

a set value of the delay time to be applied to the audio signal is changed for each speaker based on the change amount input by the user in the setting step.

12. The signal delay adjustment method according to claim 11, wherein, when an arbitrary value is input by the user as the change amount of the delay time to be applied to the audio signal for each speaker:

the setting value of the delay time to be applied to the audio signal is changed for each speaker based on the input arbitrary value in the setting step.

13. The signal delay adjustment method according to claim 11, wherein, when a predetermined fixed value is input by the user as the change amount of the delay time to be applied to the audio signal for each speaker:

the setting value of the delay time to be applied to the audio signal is changed, for each speaker, by the delay time of the predetermined fixed value based on the input by the user in the setting step.

14. The signal delay adjustment method of claim 10, further comprising:

an instruction step of instructing whether or not to set a delay time for each speaker stored, in advance, in a predetermined storage medium as the delay time to be applied to the audio signal for each speaker; and a calculation step of calculating the change amount of the delay time to be applied to the audio signal for each speaker based on the delay time for each speaker stored in the storage part and the existing delay time for each speaker when it is instructed in the instruction step to set the delay time for each speaker stored in the storage part as the delay time to be applied to the audio signal for each speaker, wherein the set value of the delay time to be applied to the audio signal is changed for each speaker based on the change amount of the delay time calculated in the calculation step.

15. The signal delay adjustment method according to claim 14, wherein the predetermined device is installed in a vehicle, and wherein the delay time stored in advance in a storage medium for each speaker is set in advance so that the sounds output from the speakers simultaneously reach a predetermined seat position in the vehicle.

* * * * *